(12) United States Patent
Gonzalez

(10) Patent No.: US 8,563,797 B2
(45) Date of Patent: Oct. 22, 2013

(54) METHOD FOR SAFELY DISPOSING MEDICINES

(76) Inventor: Faustino Gonzalez, Wellington, FL (US)

( * ) Notice: Subject to any disclaimer, the term of this patent is extended or adjusted under 35 U.S.C. 154(b) by 0 days.

(21) Appl. No.: 13/400,489

(22) Filed: Feb. 20, 2012

(65) Prior Publication Data
US 2012/0145053 A1   Jun. 14, 2012

Related U.S. Application Data

(62) Division of application No. 12/539,950, filed on Aug. 12, 2009, now Pat. No. 8,118,159.

(60) Provisional application No. 61/088,428, filed on Aug. 13, 2008.

(51) Int. Cl.
*A62D 3/30* (2007.01)

(52) U.S. Cl.
USPC .......................... 588/313; 588/405; 588/410

(58) Field of Classification Search
USPC ......... 588/300, 313, 317, 318, 405, 410, 261, 588/900
See application file for complete search history.

(56) References Cited

U.S. PATENT DOCUMENTS 5,130,092 A * 7/1992 Liu .................................. 422/28
5,663,477 A * 9/1997 Honeycutt .................... 588/320

* cited by examiner

*Primary Examiner* — Edward Johnson
(74) *Attorney, Agent, or Firm* — Jay Schloff; Aidenbaum Schloff and Bloom PLLC

(57) ABSTRACT

A method for safely disposing of medicines includes converting the medicines into a partially solid mass that may be incinerated. The medicines may be treated with a bittering agent capable of denaturing the stored medicines and with a coloring agent capable of providing a characteristic color to the denatured medicines. The medicines may also be treated with a thickening agent that is capable of converting the denatured medicines into a partially solid disposable mass, prior to incinerating the medicines.

6 Claims, 1 Drawing Sheet

METHOD FOR SAFELY DISPOSING MEDICINES

CROSS REFERENCE TO RELATED APPLICATIONS

The present application is a divisional application of pending U.S. patent application Ser. No. 12/539,950, filed on Aug. 12, 2009, now U.S. Pat. No. 8,118,159 and also claims priority under 35 United States Code, Section 119 on the provisional application No. 61/088,428 filed on Aug. 13, 2008, the disclosures of which applications are incorporated by reference.

FIELD OF THE DISCLOSURE

The present disclosure relates to a method for safely disposing medicines, and more particularly, to a method that allows conversion of medicines into an easy-to-dispose mass.

BACKGROUND OF THE DISCLOSURE

The present procedures for disposal of medicines, especially expired medicines and unused medicines, pose a serious threat to public health. People dispose the medicines present in their residences by either flushing the medicines in a public drainage system (i.e., down their toilets or sinks), or by throwing the medicines out with other household trash. Medical institutions, such as hospices and nursing homes, also follow a similar procedure. They dispose the medicines, present in their premises or homes of their patients, by flushing the medicines in the public drainage system. Some medical institutions follow a procedure of dissolving the medicines in hot water, absorbing them in diapers or mixing them in cat litter, before throwing them in the garbage.

The medicines flushed in the public drainage systems reach municipal water or effluent treatment plants of municipalities. Medicines disposed of with other regular trash reach landfills, where they leech into water bodies present in the landfills or into groundwater. These water bodies or groundwater supply usually flow out to municipal water or effluent treatment plants. The effluent treatment plants are designed to efficiently remove conventional pollutants, such as sand particles and bacteria, from water and may be incapable of completely removing the medicines from the effluents. As a result, water with traces of medicines may reach our homes through a municipality-based water supply, because of the effluent treatment plant's inability to remove the medicine materials from the water before returning such water to a municipal water supply for human consumption.

The consumption of water polluted with traces of medicines by humans and animals may develop give rise to serious complications. Further, the complications may develop slowly and may be undetectable for long durations of time. An inadvertent and continuous consumption of the medicines may therefore be highly detrimental to public health. Therefore, there is a need to develop an efficient method for disposing medicines.

Moreover, the present procedures of disposal of medicines, especially psychotropic medicines, increased the chances of access to these medicines by unauthorized persons, such as addicts. Psychotropic medicines are highly addictive, and therefore, may lure addicts. The addicts may resolve to means, such as stealing, to acquire the psychotropic medicines discarded by the medical institutions. Therefore, there is a need to develop an efficient system for disposing medicines that reduces risk of stealing of the medicines by addicts and other unauthorized persons.

Various conventional disposal systems have been developed for safely disposing medicines and hazardous medical wastes, such as needle syringes, pathological and dental wastes, and surgical gloves. Though these conventional disposal systems have been effective in disposing hazardous medical wastes, they may be ineffective in disposing medicines.

Therefore, there exists a need to develop a method that allows safe and environment friendly disposal of medicines, thereby ensuring that our municipality water supply is completely free from any traces of these medicines. Further, there is a need to develop a method that prevents any access of the medicines by unauthorized persons. Furthermore, the method should be lightweight, inexpensive to manufacture and portable. Moreover, the method should be convenient to use, so that the general public may be able to use the method without any undue problems.

SUMMARY OF THE DISCLOSURE

In view of the foregoing disadvantages inherent in the prior art, the general purpose of the present disclosure is to provide a method for safely disposing medicines, which includes all the advantages of the prior art, and overcomes the drawbacks inherent therein.

Accordingly, an object of the present disclosure is to provide a method that allows a user to dispose of medicines in a safe and environment friendly manner. Another object of the present disclosure is to provide a method for safely disposing of medicines, such that the method is lightweight, inexpensive to manufacture, portable and easy to use. Yet another object of the present disclosure is to provide a method for safely disposing medicines, such that, the method prevents any unauthorized access of the medicines.

In light of the above objects, the present disclosure provides a method for safely disposing of medicines. The method includes providing the medicines. Further, the method includes converting the medicines into a partially solid disposable mass, which is capable of being incinerated. Furthermore, the method includes incinerating the partially solid disposable mass, thereby safely disposing the medicines.

These together with the other aspects of the present disclosure, along with the various features of novelty that characterized the present disclosure, are pointed out with particularity in the claims annexed hereto and form a part of the present disclosure. For a better understanding of the present disclosure, its operating advantages, and the specified object attained by its uses, reference should be made to the accompanying drawings and descriptive matter in which there are illustrated exemplary embodiments of the present disclosure.

BRIEF DESCRIPTION OF THE DRAWING

The advantages and features of the present disclosure will become better understood with reference to the following detailed description and claims taken in conjunction with the accompanying drawings, and in which:

Like reference numerals refer to like parts throughout the description of several views of the drawings.

DETAILED DESCRIPTION OF THE DISCLOSURE

Figures 1A, 1B:
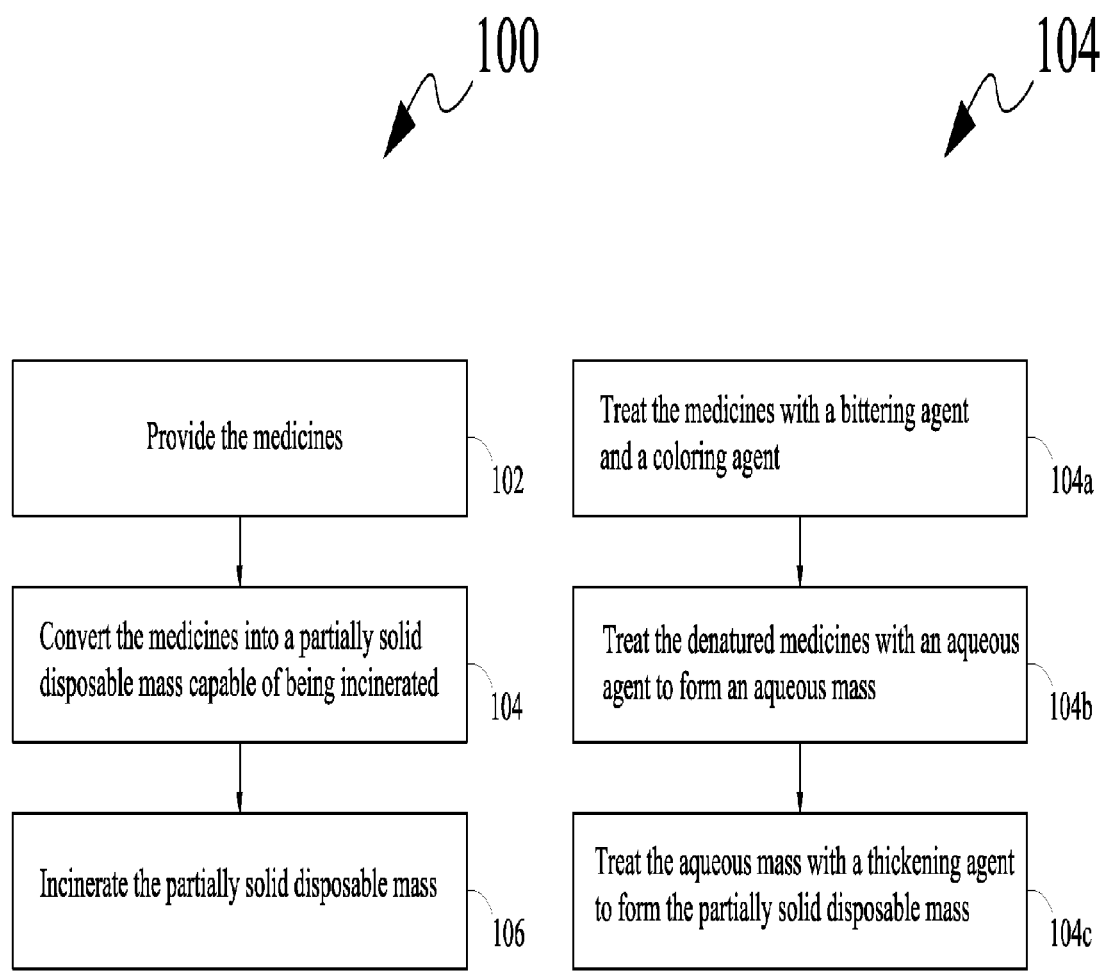
FIG. 1A depicts a block diagram illustrating a method for safely of disposing medicines, according to an embodiment of the present disclosure.
FIG. 1B depicts a block diagram illustrating conversion of the medicines into a partially solid disposable mass, according to an embodiment of the present disclosure.

For a thorough understanding of the present disclosure, reference is to be made to the following detailed description, including the appended claims, in connection with the above-described drawing. Although the present disclosure is described in connection with exemplary embodiments, the present disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure.

Also, it is to be understood that the phraseology and terminology used herein is for the purpose of description and should not be regarded as limiting. The terms "a" and "an" herein do not denote a limitation of quantity, but rather denote the presence of at least one of the referenced item.

The use of "including," "comprising," or "having" and variations thereof herein is meant to encompass the items listed thereafter and equivalents thereof as well as additional items. Further, the use of terms "first", "second", and "third", and the like, herein do not denote any order, quantity, or importance, but rather are used to distinguish one element from another. Unless limited otherwise, the terms "configured," "disposed," "placed," "attached" and variations thereof herein are used broadly and encompass direct and indirect attachments, couplings, and engagements. In addition, the terms "attached" and "coupled" and variations thereof are not restricted to physical or mechanical attachments or couplings.

The present disclosure provides a method for safely disposing of medicines. The term 'medicine' as mentioned herein refers to a chemical or biological substance that may be used to treat, prevent or alleviate symptoms of a disease. The method for safely of disposing medicines of the present disclosure will now be described with reference to FIG. 1A and FIG. 1B.

FIG. 1A depicts a block diagram of a method 100 for safely of disposing medicines, according to an embodiment of the present disclosure. The method 100 includes providing medicines, at 102. It should be understood that in the present disclosure, the term 'medicine' specifically refers to unused or expired medicines. It will be apparent to a person skilled in the art that medicines have a particular shelf life. The medicines that are left unused after the completion of the shelf life become impotent and sometimes harmful if ingested. Such medicines may be referred to as 'expired medicines.' However, it should be clearly understood that the method 100 described herein may also be used for disposing medicines that are unexpired.

The method 100 further includes converting the medicines into a partially solid disposable mass capable of being incinerated, at 104. The conversion of the medicines into the partially solid disposable mass will be explained in detail with reference to FIG. 1B.

FIG. 1B depicts a block diagram illustrating the conversion of medicines into the partially solid disposable mass. As depicted in FIG. 1B, the conversion includes treating the medicines with a bittering agent and a coloring agent, at 104a. It will be apparent to a person skilled in the art that the term 'bittering agent' as mentioned herein refers to a nontoxic chemical or biological compound that is capable of denaturing a substance. In the present disclosure, the bittering agent includes denatonium benzoate (quaternary ammonium cation), which has a property of specifically denaturing alcohol and turning almost every substance bitter. However, it should be clearly understood that use of denatonium benzoate should not be construed as a limitation to the present disclosure. Therefore, use of other bittering agents capable of denaturing the substance they react with may also be considered in the scope of the present disclosure.

The term 'coloring agent' as mentioned herein may refer to a nontoxic chemical or biological compound capable of providing a characteristic color to the medicines denatured by the bittering agent. The characteristic color provided by the coloring agent makes the medicines unattractive. In the present disclosure, the coloring agent includes a red dye. However, it should be clearly understood that use of the red dye should not be considered as a limitation to the present disclosure. Therefore, other coloring agents capable of providing a characteristic color to substances they react with may also be considered in the scope of the present disclosure.

After the formation of the denatured medicines, at 104a, the conversion further includes treating the denatured medicines with an aqueous agent, at 104b. The treatment of the denatured medicines with the aqueous agent leads to formation of an aqueous mass. The term 'aqueous agent' as mentioned herein may refer to a chemical compound capable of providing an aqueous medium. In the present disclosure, the aqueous agent includes water or carbonated water (also referred to as 'soda'). However, it should be clearly understood that use of water or carbonated water should not be considered as a limitation to the present disclosure. Therefore, other aqueous agents capable of providing an aqueous medium may also be considered in the scope of present disclosure.

The aqueous mass formed at 104b, may then be partially solidified. The partial-solidification of the aqueous mass is necessary for easy handling of the aqueous mass. Further, partial-solidification of the aqueous mass prevents any spillage of the aqueous mass. To achieve this, the aqueous mass is treated with a thickening agent to form the partially solid disposable mass, at 104c. The term 'thickening agent' as mentioned herein may refer to a nontoxic chemical compound capable of partially solidifying a substance. More specifically, a thickening agent may solidify the substance by reacting with any water present in the substance. In the present disclosure, the thickening agent includes sodium polyacrylate (also referred to as 'acrylic sodium salt polymer'), which has a capability of absorbing as much as about 200 to about 300 times of water than its mass. However, it should be clearly understood that the use of sodium polyacrylate as the thickening agent should not be considered as a limitation to the present disclosure. Therefore, other thickening agents capable of solidifying a substance they interact with may also be considered in the scope of the present disclosure.

After the conversion of the medicines into the partially solid disposable mass, at 104, the method 100 includes incinerating the partially solid disposable mass, at 106. The incineration of the partially solid disposable mass produces only carbon dioxide and water vapors. Hence, the incineration in such manner allows a safe, clean, and environment friendly disposal of the medicines.

Based on the foregoing, the present disclosure provides a method that allows safe and environment friendly disposal of medicines. The method may be used by general public, specialized medical institutions (such as hospices) municipalities and drug retailers. Further, the method is such that it prevents any access of the medicines by unauthorized persons. Moreover, the method may be practiced with lightweight materials, is inexpensive to manufacture and portable. In addition, the method is convenient to use, so that the general public may be able to use the apparatus without any undue problems. Also, the method may be practiced in various customized sizes, shapes, and designs. Further, the method ensures that the medicines are disposed in a safe and environment friendly manner.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present disclosure.

What is claimed is:

1. A method for safely disposing medicines, the method comprising:
   providing the medicines;
   converting the medicines into a partially solid disposable mass capable of being incinerated, wherein converting the medicines into the partially solid disposable mass comprises:
   treating the medicines with a bittering agent and a coloring agent to denature the medicines;
   treating the denatured medicines with an aqueous agent to form an aqueous mass; and
   treating the aqueous mass with a thickening agent to form the partially solid disposable mass; and
   incinerating the partially solid disposable mass, thereby safely disposing the medicines.

2. The method of claim 1, wherein the bittering agent comprises denatonium benzoate.

3. The method of claim 1, wherein the coloring agent comprises a red dye.

4. The method of claim 1, wherein the thickening agent comprises sodium polyacrylate.

5. The method of claim 1, wherein the aqueous agent comprises water.

6. The method of claim 1, wherein the aqueous agent comprises carbonated water.

* * * * *